United States Patent
Oh

(12) United States Patent (10) Patent No.: US 7,805,166 B2
Oh (45) Date of Patent: Sep. 28, 2010

(54) INITIALIZATION METHOD OF MOBILE TERMINAL

(75) Inventor: Dae-Serk Oh, Chungcheongnam-Do (KR)

(73) Assignee: LG Electronics Inc., Seoul (KR)

( * ) Notice: Subject to any disclaimer, the term of this patent is extended or adjusted under 35 U.S.C. 154(b) by 483 days.

(21) Appl. No.: 10/917,206

(22) Filed: Aug. 11, 2004

(65) Prior Publication Data

US 2005/0037811 A1 Feb. 17, 2005

(30) Foreign Application Priority Data

Aug. 12, 2003 (KR) ............... 10-2003-0055780

(51) Int. Cl.
*H04B 1/38* (2006.01)
*H04M 11/00* (2006.01)

(52) U.S. Cl. .............. 455/558; 455/407; 455/559

(58) Field of Classification Search ............ 455/558, 455/522, 13.4, 450, 452.1, 559, 161.1, 179.1, 455/184.1, 185.1, 186.1, 435, 407; 379/211.05
See application file for complete search history.

(56) References Cited

U.S. PATENT DOCUMENTS

| | | | | |
|---|---|---|---|---|
| 5,442,806 A * | 8/1995 | Barber et al. | ............ | 455/435.2 |
| 5,953,665 A * | 9/1999 | Mattila | ............ | 455/434 |
| 5,999,811 A * | 12/1999 | Molne | ............ | 455/432.3 |
| 6,137,772 A * | 10/2000 | Turcotte et al. | ............ | 370/329 |
| 6,185,436 B1 * | 2/2001 | Vu | ............ | 455/558 |
| 6,199,120 B1 * | 3/2001 | Tanaka | ............ | 710/16 |
| 6,459,688 B1 * | 10/2002 | Bursztejn et al. | ............ | 370/329 |
| 6,463,300 B1 * | 10/2002 | Oshima | ............ | 455/558 |
| 6,494,284 B1 * | 12/2002 | Cooper | ............ | 180/282 |
| 6,778,827 B1 * | 8/2004 | Anderson et al. | ............ | 455/434 |
| 7,505,769 B2 * | 3/2009 | Jiang | ............ | 455/432.3 |
| 2004/0166839 A1 * | 8/2004 | Okkonen et al. | ............ | 455/419 |
| 2004/0180657 A1 * | 9/2004 | Yaqub et al. | ............ | 455/435.1 |
| 2005/0101323 A1 * | 5/2005 | De Beer | ............ | 455/435.2 |

* cited by examiner

*Primary Examiner*—Charles N Appiah
*Assistant Examiner*—Emem Stephen
(74) *Attorney, Agent, or Firm*—Lee, Hong, Degerman, Kang & Waimey

(57) ABSTRACT

An initialization method for a mobile terminal having an Integrated Circuit (IC) card is provided. The method comprises updating frequency information of the mobile terminal when power is applied to the mobile terminal based on information stored in the IC card; and searching a cell on the basis of the updated frequency information.

8 Claims, 2 Drawing Sheets

INITIALIZATION METHOD OF MOBILE TERMINAL

CROSS-REFERENCE TO RELATED APPLICATIONS

Pursuant to 35 U.S.C. §119(a), this application claims the benefit of earlier filing date and right of priority to Korean Patent Application No. 10-2003-55780, filed on Aug. 12, 2003, the content of which is hereby incorporated by reference herein in its entirety.

BACKGROUND OF THE INVENTION

1. Field of the Invention

The present invention relates to an initialization method of a mobile terminal and, more particularly, to an initialization method of a mobile terminal having an IC (Integrated Circuit) card.

2. Description of the Related Art

A large capacity memory chip or a USIM (Universal Subscriber Identity Module) may be mounted in mobile terminals. The USIM is an IC card for storing information such as user password, roaming information, personal phone number of the user, or the like.

By inserting the USIM into the mobile terminal, a user can use an authentication service, an international roaming service, an electronic commerce service, etc. The USIM can protect critical user information as it can be removed and stored separately from the mobile terminal.

Mobile terminals are configured for initialization (or booting). While the initialization is proceeding, the mobile terminal initializes various applications and memory units, and performs multiple tasks such as performing of an initial cell searching.

For an aeronautical mobile satellite service (AMSS) provided by Qualcomm, users use USIM mounted terminals. A USIM mounted AMSS terminal is configured to load PLMN (Public Land Mobile Network) information from the USIM and to perform an initial cell searching at the time of initialization. An AMSS terminal scans every frequency in a service band on the basis of the loaded information for performing the initial cell searching.

Among the tasks performed during initialization, the initial cell searching takes a relatively long time because the terminal scans every frequency of the service band and interfaces with the USIM whenever performing initialization. A method and system is needed to overcome this problem.

SUMMARY OF THE INVENTION

An initialization method for a mobile terminal having an Integrated Circuit (IC) card is provided. The method comprises updating frequency information of the mobile terminal when power is applied to the mobile terminal based on information stored in the IC card; and searching a cell on the basis of the updated frequency information.

The updating comprises determining whether a first IC card attached to the mobile terminal is replaced with a second IC card; and loading second frequency information from the second IC card, if the first IC card is replaced. The updating may further comprise comparing the second frequency information with first frequency information stored in a memory of the mobile terminal and replacing the first frequency information with the second frequency information, if the first and second frequency information are different.

In one embodiment, a cell is searched based on the frequency information stored in the memory of the mobile terminal. The frequency information comprises a physical search frequency for a communication service provider. The frequency information comprises an update flag for indicating that the IC card is replaced; and at least one frequency data block comprising frequency information for at least one communication service provider.

The at least one frequency data block comprises ID information for the at least one communication service provider; a frequency used by the at least one communication service provider; and a flag indicating whether to allow roaming with the at least one communication service provider.

In accordance with one aspect of the invention, the frequency information comprises a plurality of frequency data blocks sorted in order of roaming priority and the IC card is a USIM (Universal Subscriber Identity Module) card.

In accordance with another embodiment, a mobile terminal configured to receive an Integrated Circuit (IC) card is provided. The mobile terminal comprises means for updating frequency information for the mobile terminal when power is applied to the mobile terminal based on information stored in the IC card; and means for searching a cell on the basis of the updated frequency information.

The updating means determines whether a first IC card attached to the mobile terminal is replaced with a second IC card and the updating means loads second frequency information from the second IC card, if the first IC card is replaced. The updating means further compares the second frequency information with a first frequency information stored in a memory of the mobile terminal. The updating means further replaces the first frequency information stored in a memory of the mobile terminal with the second frequency information, if the first and second frequency information are different.

The frequency information is information on a physical search frequency for communication service provider and comprises an update flag for indicating that the IC card is replaced; and at least one frequency data block sorting frequency information for at least one respective communication service provider. The at least one frequency data block comprises ID information for a corresponding communication service provider; a frequency used by the corresponding communication service provider; and a flag indicating whether to allow roaming with the corresponding communication service provider.

In yet another embodiment, an initialization method of a mobile terminal comprises loading frequency information from a first field in a memory when power is applied to a terminal; and searching a cell based on the loaded frequency information. The frequency information comprises physical search frequency data for at least one communication service provider.

The frequency information comprises a plurality of frequency data blocks storing actual frequency information for a plurality of respective service providers, wherein each of the plurality of frequency data blocks comprises ID information for a corresponding communication service provider; a frequency used by the corresponding communication service provider; and a flag indicating whether to allow roaming with the corresponding communication service provider.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The invention will be described in detail with reference to the following drawings in which like reference numerals refer to like elements.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

In accordance with one embodiment, an operation frequency of a mobile terminal is converted into a code (i.e., 'operation frequency code'). The mobile communication terminal processes and stores the code in a specific field (i.e., 'initialization data field') of a memory or an IC card of the terminal.

Figure 1:
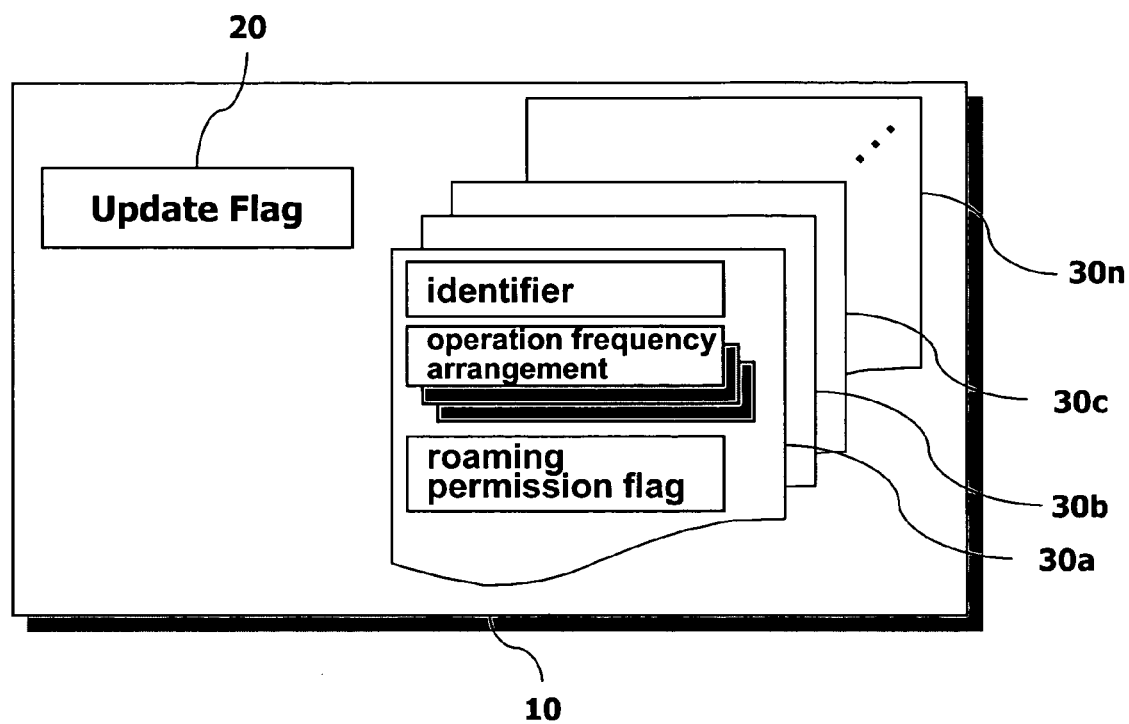
FIG. 1 illustrates an operation frequency code data structure in accordance with one embodiment of the invention.

Referring to FIG. 1, an operation frequency code 10 comprises an update flag 20 and a plurality of data blocks 30a through 30n respectively associated with a plurality of communication service providers and equipment manufacturers (e.g., terminal and USIM card manufacturers).

The update flag 20 is a value for indicating that a USIM card has been replaced. If the USIM card has been replaced, the flag has an active value '1', for example. If the USIM card has not been replaced, the flag has an inactive value '0', for example.

The data blocks 30a~30n comprise frequency data blocks 30a, 30b, 30c, . . . , 30n corresponding to the communication service providers, ordered according to a roaming priority for the mobile terminal. Each block comprises an identifier field, an operation frequency arrangement field and a roaming permission flag.

The identifier field stores a specific identification code for the respective communication service provider. The frequency field has an array structure, for example, and stores a frequency used by the identified communication service provider. The roaming permission flag stores a roaming permission value (e.g., active value '1' or inactive value '0'). The mobile terminal determines whether to allow roaming based on the roaming permission flag.

When a user replaces the USIM card, the terminal updates its operation frequency code 10 based on the information stored in the USIM card. That is, the terminal loads the operation frequency code 10 from the newly replaced USIM card and stores it in memory.

Figure 2:
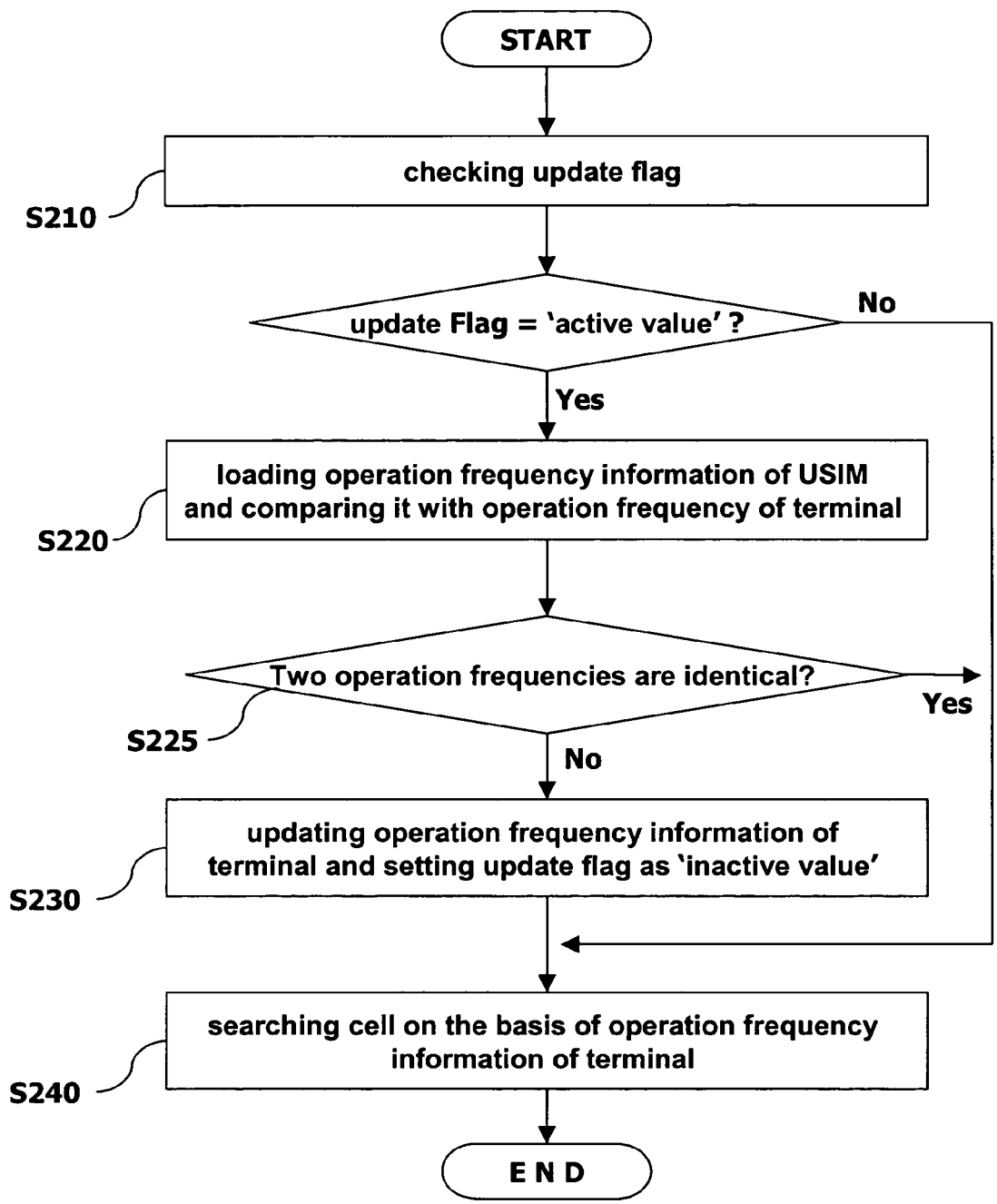
FIG. 2 is a flow chart of initialization of a mobile terminal in accordance with an embodiment of the invention.

Referring to FIG. 2, when a USIM card is attached, the mobile terminal checks the update flag 20 (S210). If update flag is inactive then that is an indication that the USIM card has not been replaced. Thus, the terminal continues to search the cell based on the operation frequency code stored in its memory (S240).

On the other hand, if the update flag is active, then it is an indication that the old USIM card has been replaced with a new one. If so, the mobile terminal loads the operation frequency code 10 from the USIM card and compares it with the operation frequency code stored in memory of the mobile terminal (S220).

If the two operation frequency codes are identical (S225), the mobile terminal searches a cell based on the old operation frequency code. If, however, the two codes are different, the terminal updates its operation frequency code with the operation frequency code 10 in the USIM card (S230). The mobile then terminal searches a cell on the basis of the updated operation frequency code 10 (S240) and preferably changes the update flag 20 to an inactive value.

In the present invention, the update flag 20 is added in the operation frequency code 10. As a result, interfacing does not need to be performed between the terminal and the USIM card repeatedly at the time of initialization. The terminal interfaces with the USIM card only when the update flag 20 has the active value. Accordingly, the initialization time is shortened.

In a second embodiment of the invention, the initial cell searching is performed in a mobile terminal, which does not use the USIM card. A mobile terminal in accordance with the second embodiment of the invention comprises arrangement variables stored in memory, wherein the variables correspond to one or more communication service providers. Operation frequency codes of said communication service providers are stored in the respective variables in a memory of the mobile terminal, for example.

When initialization begins, the terminal searches a cell with reference to the variables. The operation frequency code in accordance with the second embodiment of the invention comprises an identifier field, an operating frequency arrangement field, and a roaming permission flag field. The identifier, the operation frequency arrangement and the roaming permission flag fields are utilized in a similar manner as defined with respect to the first embodiment. In accordance with the second embodiment, the terminal has a hidden menu by which the terminal edits the operation frequency code, for example.

As so far described, the initialization method of a mobile terminal in accordance with the present invention has the following advantages. By limiting the frequency range used for an initial cell searching to a particular frequency, time required for the cell searching is reduced. By providing a flag (update flag), the initialization time of the terminal can be reduced and a booting speed of the terminal can be enhanced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An initialization method for a mobile terminal having an Integrated Circuit (IC) card, the method comprising:

determining whether a first IC card attached to the mobile terminal is replaced with a second IC card, based on a flag value stored in internal memory of the mobile terminal, in response to initialization of the mobile terminal, wherein the flag value is set to an inactive state, if the first IC card is not replaced; and the flag value is set to an active state, if the first IC card is replaced while the terminal has been in an OFF state;

loading first frequency information from the internal memory and second frequency information from the second IC card, if the value of the flag is set to an active state;

comparing the second frequency information with the first frequency information;

storing the second frequency information in the internal memory of the mobile terminal instead of the first frequency information, if the first and second frequency information are different, wherein the second frequency information comprises at least one frequency data block comprising frequency information for communicating with at least one communication service provider;

updating the flag value stored in internal memory for indicating that the second IC card has replaced the first IC card, regardless of whether the mobile terminal supports more than one IC card and changing the flag value to the inactive state, if the flag is set to the active state;

searching for a cell during initialization of the mobile terminal based on the second frequency information stored in the internal memory of the mobile terminal; and communicating over the second frequency, until it is determined that the second IC card is replaced with a third IC card having third frequency information, wherein the flag value is set to the active state if the second IC card is replaced with a third IC card having third frequency information while the terminal has been in an OFF state.

2. The method of claim 1, wherein the at least one frequency data block comprises:

ID information for the at least one communication service provider;

a frequency used by the mobile terminal to communicate with the at least one communication service provider; and a flag indicating whether to allow roaming with the at least one communication service provider.

3. The method of claim 1, wherein the frequency information comprises a plurality of frequency data blocks sorted in order of priority.

4. The method of claim 1, wherein the first and second IC cards are USIM (Universal Subscriber Identity Module) cards.

5. An initialization system for a mobile terminal having an Integrated Circuit (IC) card, the system comprising:

means for determining whether a first IC card attached to the mobile terminal is replaced with a second IC card based on a flag value stored in internal memory of the mobile terminal, in response to initialization of the mobile terminal, wherein the flag value is set to an inactive value, if the first IC card is not replaced and the flag value is set to an active value, if the first IC card is replaced while the terminal has been in an OFF state;

means for loading first frequency information from the internal memory and second frequency information from the second IC card, if the set value of the flag is an active value;

means for comparing the second frequency information with the first frequency information;

means for storing the second frequency information in the internal memory of the mobile terminal instead of the first frequency information, if the first and second frequency information are different wherein the second frequency information comprises at least one frequency data block comprising frequency information for communicating with at least one communication service provider;

means for updating the flag value stored in internal memory for indicating that the second IC card has replaced the first IC card, regardless of whether the mobile terminal supports more than one IC card and changing a set value of the flag to the inactive value, if the set value of the flag is an active value;

means for searching for a cell during initialization of the mobile terminal based on the second frequency information stored in the internal memory of the mobile terminal; and means for communicating over the second frequency, until it is determined that the second IC card is replaced with a third IC card having third frequency information, wherein the flag value is set to the active value if the second IC card is replaced with a third IC card having third frequency information while the terminal has been in an OFF state.

6. The system of claim 5, wherein the at least one frequency data block comprises:

ID information for the at least one communication service provider;

a frequency used by the mobile terminal to communicate with the at least one communication service provider; and a flag indicating whether to allow roaming with the at least one communication service provider.

7. The system of claim 5, wherein the frequency information comprises a plurality of frequency data blocks sorted in order of priority.

8. The system of claim 5, wherein the first and second IC cards are USIM (Universal Subscriber Identity Module) cards.

* * * * *